United States Patent [19]

Borchardt

[11] Patent Number: 4,600,057

[45] Date of Patent: Jul. 15, 1986

[54] METHOD OF REDUCING THE PERMEABILITY OF A SUBTERRANEAN FORMATION

[75] Inventor: John K. Borchardt, Houston, Tex.

[73] Assignee: Halliburton Company, Duncan, Okla.

[21] Appl. No.: 663,803

[22] Filed: Oct. 23, 1984

[51] Int. Cl.$^4$ ............................................. E21B 43/22
[52] U.S. Cl. .................................... 166/295; 166/294
[58] Field of Search ............... 166/294, 275, 295, 300; 523/130, 131; 405/264

[56] References Cited

U.S. PATENT DOCUMENTS

| | | |
|---|---|---|
| 2,304,917 | 12/1942 | Hopff et al. . |
| 2,486,191 | 10/1949 | Minsk et al. . |
| 3,029,229 | 4/1962 | Boeli . |
| 3,079,336 | 2/1963 | Stright et al. . |
| 3,254,719 | 6/1966 | Root . |
| 3,308,885 | 3/1967 | Sandiford . |
| 3,321,431 | 5/1967 | Cruden . |
| 3,490,533 | 1/1970 | McLaughlin . |
| 3,881,552 | 5/1975 | Hessert ................................ 166/294 |
| 3,989,633 | 11/1976 | Frisque . |
| 4,070,323 | 1/1978 | Vanderhoff et al. . |
| 4,073,343 | 2/1978 | Harnsberger ........................ 166/295 |
| 4,120,842 | 10/1978 | Harnsberger ........................ 523/131 |
| 4,168,614 | 9/1979 | Rieuz .................................. 166/295 |
| 4,218,327 | 8/1980 | Wellington . |
| 4,334,049 | 6/1982 | Ramlow et al. . |
| 4,413,087 | 11/1983 | Bernot . |
| 4,426,296 | 1/1984 | Crowe . |
| 4,489,785 | 12/1984 | Cole .................................... 523/130 |

Primary Examiner—Stephen J. Novosad
Assistant Examiner—Bruce M. Kisliuk
Attorney, Agent, or Firm—Edward F. Sherer

[57] ABSTRACT

A method of reducing the permeability of a subterranean formation comprising contacting the formation with an aqueous polymerizable composition comprising a polymerization monomer, a polymerization catalyst having a latent period, and an alcoholic compound selected from the group consisting of a cyclic ether containing a hydroxymethylene substituent on a carbon atom bonded to the ether oxygen, an aliphatic alcohol having a carbon-to-carbon double bond or a carbon-to-carbon triple bond, and mixtures thereof.

20 Claims, No Drawings

METHOD OF REDUCING THE PERMEABILITY OF A SUBTERRANEAN FORMATION

I. BACKGROUND AND SUMMARY OF THE INVENTION

This invention relates to a method of treating a subterranean formation of non-uniform permeability, and more particularly concerns a method of reducing the permeability of subterranean formations to water thereby promoting better control of fluid injection patterns in the secondary or tertiary recovery of hydrocarbons and achieving water reduction in producing wells and thus reducing the quantity of water recovered from a subterranean formation penetrated by a well bore whereby the relative production rate of the hydrocarbons is increased.

Since only a portion of the oil contained in a subterranean reservoir can be recovered by primary methods, it has become general practice to employ various secondary or tertiary recovery techniques to produce the additional quantities of oil not economically recovered by primary methods. Of the various secondary or tertiary recovery methods available, one of the most widely practiced techniques is the displacement of oil from the reservoir with a driving fluid such as a floodwater injected for that purpose. Normally, in carrying out the flooding process, input or injection wells are utilized. These wells can be old existing wells or can be wells which are newly drilled into the oil-producing strata. The location of the injection wells with reference to the production wells is selected to afford a desired flood pattern, the selected pattern depending in part upon field conditions, the locations of existing wells, and the operator's preference. Aqueous drive fluids, such as water, brine, or a viscous aqueous fluid are forced into the input wells under pressure, and out into the surrounding oil bearing strata towards the producing well or wells. While waterflooding has been rather widely practiced in recent years, it is not without considerable operating problems and economical limitations particularly those associated with low oil recoveries in proportion to the amount of water injected.

Various surfactant and solvent floods have been proposed as means for recovering additional quantities of oil over that recoverable by conventional waterflooding. These processes, however, face serious operating problems when practiced in heterogeneous formations containing strata or channels having permeability substantially higher than the bulk of the formation.

One of the major problems encountered in a flooding operation is the breakthrough of the flooding medium from the flood front to the producing well relatively early in the displacement process and rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due in part to the peculiar structure of the oil-bearing strata. Underground oil reservoirs, in most cases, consist of layers of sand or rock and, since no reservoir rock is perfectly uniform in composition and structure, the permeability will vary across the rock face or strata. Also, fractures, cracks, and other abnormalities can promote channeling of the displacement of the fluid.

In the normal flooding operation, maximum oil recovery is obtained when the driven fluid flows in a wide bank in front of the driving fluid which moves uniformly towards the producing well. To keep this bank of oil intact and constantly moving towards the producing well, a substantially uniform permeability must exist throughout the strata. If this uniform permeability does not exist, or is not provided, the flooding fluid will seek the areas of high permeability, and channeling occurs with the subsequent loss of some driving fluid energy and the appearance of excessive amounts of driving fluid in the producing well. Moreover, as the more permeable strata are depleted, the driving fluid has a tendency to follow the same channels and further increase the consumption of the flooding medium to the point where the process becomes uneconomical. It is, therefore, desirable to operate at a drive fluid to oil ratio that is as low as possible.

Another problem associated with the production of oil from oil-bearing formations containing highly permeable water channels or communicating with a water zone is the intrusion of water into the production well. Not only does this water intrusion cause production and disposal problems, but more importantly the beneficial effect of the natural water drive is at least, in part, lost thereby adversely affecting oil recovery.

It is advantageous to reduce the permeability of the water channels so as to render the formation more uniformly permeable and to increase the unit efficiency of the water drive, or alternatively to shut off the water intrusion.

Many processes have been proposed for reducing the permeability of a subterranean formation. For example, U.S. Pat. No. 3,308,885 discloses introducing an aqueous solution of water-soluble polyacrylamide into a subterranean formation around a well bore to reduce the water/oil ratio of the formation effluent.

A difficulty with the injection of a polymer solution into a subterranean formation is the high pressure required to inject the polymer at the well bore. The high pressure required to inject a viscous polymer solution at the well bore increases the risk of damage to the formation by fracturing.

U.S. Pat. No. 3,490,533, which is assigned to assignee of the present invention and is hereby incorporated by reference, discloses a method of introducing a polymerizable solution into a subterranean formation around a well bore comprising the injection of a polymerizable monomer dissolved in water and containing a polymerization catalyst having a latent period into the well bore, pressurizing the water containing monomer and polymerization catalyst so that it flows from the well bore into the surrounding formation and permitting the monomer to polymerize within the formation after the latent period of the catalyst has expired.

Although the method of U.S. Pat. No. 3,490,533 has been successful in introducing polymer solutions into the formation without damage to the formation, certain problems remain. The bottom hole temperature of a formation varies with geographical location of the formation and the depth of the formation. A number of formations have temperatures greater than 160° F. and the polymer solution of U.S. Pat. No. 3,490,533 is not particularly stable at temperatures greater than 160° F.

It is therefore, desirable to provide a method of treating a subterranean formation of non-uniform permeability to reduce the permeability of the formation to water which is effective at temperatures greater than 160° F. and which can be introduced into the formation without damage to the formation.

The method of the present invention resides in a method for reducing the permeability of a subterranean formation having a temperature greater than 160° F. and penetrated by at least one well bore by contacting the surfaces of the formation with an aqueous polymerizable composition. The method of the invention can be used in either the injection of waterfloods, polymer floods, or CO$_2$ floods or hydrocarbon production wells for the purpose of reducing the water/oil ratio produced therefrom; e.g., reduce the mobility of water in the well bore area.

According to the present invention, the permeability to water of a subterranean formation is reduced by contacting the formation with an aqueous polymerizable composition comprising a polymerizable monomer, a polymerization catalyst having a latent period, and an alcoholic compound selected from the group consisting of a cyclic ether containing a hydroxymethylene substituent on a carbon atom bonded to the ether oxygen, an aliphatic alcohol having a carbon-to-carbon double bond or a carbon-to-carbon triple bond, and mixtures thereof. The aqueous polymerizable composition containing the polymerizable monomer, the polymerization catalyst having the latent period, and the alcoholic compound are allowed to flow from the well bore into the surrounding formation to contact the surface of the formation and the monomer is allowed to polymerize within the formation after the latent period of the catalyst has expired to form as a final product the desired viscous but still flowable aqueous composition. The alcoholic compound increases the heat stability of the polymer produced in the aqueous composition. The heat stability of the polymer produced in the aqueous composition has been found to be greater than the heat stability of a polymer produced by polymerizing the polymerizable monomer using the polymerization catalyst and subsequently adding the alcoholic compound to the polymer.

The use of the method of the present invention results in a reduction in permeability of the subterranean formation. Furthermore, the resulting polymer composition is effective at high temperatures including temperatures greater than 160° F. and even as high as 250° F. or more.

II. DESCRIPTION OF THE PREFERRED EMBODIMENTS

The polymerizable monomer suitable for use in the present invention is selected from the group consisting of

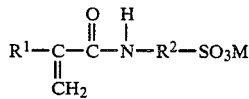

wherein:
R$^1$ is selected from the group consisting of hydrogen and methyl;
R$^2$ is selected from the group consisting of an alkylene group having 1 to about 4 carbon atoms such as methylene, ethylene, propylene, or 2-methylpropylene; and,
M is selected from the group consisting of hydrogen, ammonium, and an alkali metal such as sodium or potassium;

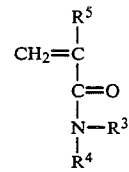

wherein: R$^3$, R$^4$, and R$^5$ are independently selected from the group consisting of hydrogen and methyl; and, mixtures of I and II.

The amount of polymerizable monomer used in the practice of the invention will vary widely depending on the monomer utilized, the purity of the monomer, and the properties desired in the aqueous composition. Generally speaking, amounts of polymerizable monomer in the range of from about 2.5 to about 10.0 and more preferably from about 3.0 to about 5.0 weight percent based on the weight of water in the aqueous composition can be used. Amounts outside this range, however, can also be used but are not generally practical.

Monomers of the above formula I and methods for their preparation are known in the art. In the above formula I when R$^1$ is hydrogen,

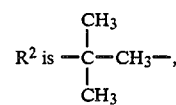

and M is hydrogen, the monomer is 2-acrylamido-2-methylpropanesulfonic acid which is known as AMPS (trademark of The Lubrizol Corporation) monomer. The alkali metal salts of said monomer, e.g., sodium 2-acrylamido-2-methylpropanesulfanate, are also readily available. Examples of other monomers of formula I include sodium 2-acrylamidopropanesulfonate and sodium 2-acrylamidoethanesulfonate.

Monomers of the above formula II and methods of their preparation are known in the art. When R$^3$, R$^4$, and R$^5$ are each hydrogen, the monomer is acrylamide. When R$^3$ and R$^4$ are each methyl and R$^5$ is hydrogen, the monomer is N,N-dimethylacrylamide. Examples of other monomers corresponding to formula II include methacrylamide and N,N-dimethylmethacrylamide.

The preferred monomer for carrying out the method of the present invention is acrylamide.

Examples of suitable alcoholic compounds include alcoholic compounds selected from the group consisting of

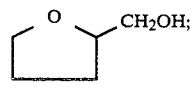

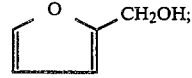

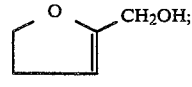

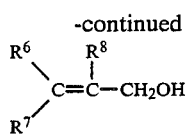

VI.

wherein $R^6$, $R^7$, and $R^8$ are independently selected from the group consisting of hydrogen and methyl; and,

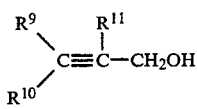

VII.

wherein $R^9$, $R^{10}$, and $R^{11}$ are independently selected from the group consisting of hydrogen and methyl; and mixtures of III, IV, V, VI, and VII.

The alcoholic compound represented by formula III is known as tetrahydrofurfuryl alcohol. The alcoholic compound represented by formula IV is known as furfuryl alcohol. The alcoholic compound represented by formula V is known as dihydrofurfuryl alcohol. Examples of alcoholic compounds corresponding to Formula VI include allyl alcohol, 2-buten-1-ol, 2-methyl-2-buten-1-ol, and 3-methyl-2-buten-1-ol. Examples of alcoholic compounds corresponding to formula VII include propargyl alcohol, 2-methylpropyn-1-ol, and 3-methylpropyn-1-ol. The preferred alcoholic compound for use in the method of the present invention is allyl alcohol.

The alcoholic compound is present in the aqueous polymerizable composition in an amount in the range of from about 0.01 to about 10 percent by weight of the polymerizable monomer and more preferably in the range of about 0.1 to about 0.5 percent by weight of the polymerizable monomer.

Various polymerization catalysts known in the art are incorporated into the aqueous composition to provide for polymerization at the desired time and to the desired degree. Examples of suitable catalysts are organic peroxides such as tert-butylhydroperoxide, cumene hydroperoxide, di(tert-butylperoxide), and methyl ethyl ketone peroxide and inorganic peroxides such as ammonium persulfate and sodium persulfate. The catalysts are chosen so that polymerization is not initiated until the monomer solution is in the formation away from the well bore. Such catalysts are said to have a latent period and are well known to those skilled in the art. The latent period is that interval of time between addition of the catalyst until the viscosity begins to increase as a manifestation of polymerization. The preferred catalyst is cumene hydroperoxide.

The quantity of catalyst used to carry out the method of the present invention will vary over a wide range. Generally, the amount of catalyst used is in the range of from about 0.0001 to about 1.0 percent by weight of the monomer and more preferably from about 0.01 percent to about 0.1 percent by weight of the monomer.

Various well known polymerization retarders such as potassium ferricyanide, potassium manganicyanide, hydroquinone, etc., may be used and are well known to those skilled in the art.

Furthermore, a small amount of a crosslinking monomer, which is well known to those skilled in the art, such as a diallyl monomer, and specifically, N,N'-methylenebisacrylamide monomer, 1,1-bis(acrylamido)-2-methyl-2-propanesulfonic acid, or bisacrylamidoacetic acid is preferably incorporated into the polymer to produce crosslinking. When utilized, the crosslinking monomer should be present in the aqueous composition in a low concentration such as from about 0.01 to about 10.0 percent by weight of the monomer and preferably about 0.5 percent by weight of monomer. An excess amount of crosslinking monomer will cause gelation. Such gelation creates a semi-rigid plug rather than the desired viscous but still flowable fluid.

A particularly preferred aqueous polymerizable composition comprises about 300 g deionized water, about 15 g acrylamide, about 0.6 g N,N'-methylenebisacrylamide, about 0.05 g allyl alcohol, about 0.025 g potassium ferricyanide, and about 0.0010 g cumene hydroperoxide.

The most preferred aqueous polymerizable composition comprises about 300 g deionized water, about 12 g acrylamide, about 0.6 g N,N'-methylenebisacrylamide, about 0.01 g allyl alcohol, about 0.025 g potassium ferricyanide, and about 0.0005 g cumene hydroperoxide.

Methods of preparing the aqueous polymerizable composition are known to those skilled in the art. One preferred method of preparing the aqueous polymerizable composition comprises stirring the desired amount of water and gradually adding, to the water, the polymerizable monomer and, if utilized, the crosslinking monomer to form a first mixture. These monomers may be solids or liquids. If the monomers utilized are solids, it is preferred that they be completely dissolved before proceeding. The alcoholic compound is added next to the first mixture to form a second mixture. It is preferred that the alcoholic compound be added to the first mixture in the form of a one percent by weight aqueous solution made from fresh water. This technique aids in accurately measuring the desired amount of alcoholic compound. If a polymerization retarder is utilized in the polymerizable composition, it is preferably added to the second mixture in the form of a one percent by weight aqueous solution made from fresh water. The polymerization catalyst is preferably added last and in the form of a 0.1 percent by weight aqueous solution made from fresh water to form a final mixture.

Stirring during the preparation of the aqueous polymerizable composition is accomplished preferably without aeration. After the addition of the final ingredient, which is preferably the polymerization catalyst, the final mixture is throughly mixed and the polymerizable composition is pumped into the well bore and into the subterranean formation to be treated.

The water used to prepare the polymerizable composition preferably contains from about 2 to about 5 percent by weight potassium chloride or sodium chloride to reduce the presence of oxygen in the water and to stabilize any swelling clays which may be present in the formation. Ammonium chloride is preferably not present in appreciable amounts in the water used to prepare the polymerizable composition.

In carrying out the method of the present invention, the aqueous composition comprising the polymerizable monomer, the polymerization catalyst, and the alcoholic compound is injected through either an injection well or an output well and into the subterranean formation. The composition flows into the most permeable portion of the subterranean formation where it is desired that the permeability be altered. After the injection of the above-described aqueous composition, a spacer fluid is preferably injected into the well to displace the mixture from the tubing and out into the formation. Preferably the volume of the spacer fluid utilized is the volume needed to displace all of the treating fluids out into the formation plus five barrels per vertical foot of interval to be treated. The well is then preferably shut-in for a period of time.

Spacer fluids that can be used in the present invention are well known in the art and include brine solutions, alkali metal halide solutions and the like.

The method can also be used either to prevent introduction of water into the producing strata of a production well and thus to increase oil production or to reduce the permeability of a formation near an injection well during a secondary or tertiary recovery operation. The net result is a reduction of water production and a resulting increase in oil production.

The following examples will serve to more comprehensively illustrate the principles of the invention but in being directed to certain specific compounds and process steps and conditions are not intended to limit the bounds of the invention.

EXAMPLE I

A series of tests were performed to evaluate the method of the present invention.

The tests were carried out by first preparing aqueous polymerizable compositions containing the following ingredients:
900 g deionized water;
37.5 g acrylamide;
1.8 g N,N'-methylenebis(acrylamide);
4.5 cc 1.0% by weight potassium ferricyanide solution;
30.0 cc 0.1% by volume cumene hydroperoxide solution; and,
Varying amounts of alcoholic compounds.

The preparation of the aqueous polymerizable compositions was carried out in a nitrogen-filled glove bag.

The aqueous polymerizable compositions were divided into three equal portions and each portion was transferred to a test bottle. The transfer was carried out either in a nitrogen-filled glove bag, or if the transfer was conducted in air, by passing nitrogen over the compositions prior to sealing the test bottle.

The test bottle had a volume of about 325 cc and the top of the bottle was sealed using a porcelain plug equiped with a TEFLON seal. A heavy metal spring was utilized to seal the plug onto the bottle. Each bottle to be tested was placed, after sealing, in an oven heated to 250° F.

The bottles were observed visually to determine the pump time. Pump time is the time a viscosity increase in the composition is first observed. The increase in viscosity could be observed by inverting the test bottle or by timing the fall of a glass bead or marble placed in the bottle. Solution viscosity of the aqueous polymerizable compositions was measured using a Brookfield Model LVT viscometer. The bottles were cooled to room temperature before being opened to permit the insertion of the viscometer spindle. The 3 day, 3.8 day, 7 day and 9 day viscosity readings, from which the percent of 24 hour value was calculated, were carried out using the same spindle and rpm as the 24 hour viscosity reading except when noted.

The results of these tests are shown in Table I.

TABLE I

| Test No. | Alcoholic Compound | Pump Time (Hours) | 24 Hour Viscosity cps (Spindle, rpm) | Viscosity (% of 24 Hour Value) After | | | |
|---|---|---|---|---|---|---|---|
| | | | | 3 days | 3.8 days | 7 days | 9 days |
| 1. | None | * | 2,220,000 (5,0.3) | 20.7 | — | — | 0.004 (2,30) |
| 2. | None | * | 1,520,000 (5,0.3) | 55.3 | — | 0.004 (2,60) | — |
| 3. | 0.001 g allyl alcohol | 4.17 | 872,000 (5,0.3) | — | — | 206.4 | — |
| 4. | 0.001 g allyl alcohol | 4.67 | 1,740,000 (5,0.3) | — | — | 146.0 | — |
| 5. | 0.01 g allyl alcohol | * | 2,660,000 (5,0.3) | — | — | 9.2 | — |
| 6. | 0.01 g allyl alcohol | 4.5 | 2,980,000 (5,0.3) | 24.8 | — | 0.02 (3,30) | — |
| 7. | 0.005 g allyl alcohol | 2.75 | 1,110,000 (5,0.6) | — | — | 0.01 (2,60) | — |
| 8. | 0.001 g 2-buten-1-ol | * | 2,980,000 (5,0.3) | — | — | 77.8 | — |
| 9. | 0.001 g 3-buten-1-ol | 4.5 | 2,180,000 (5,0.3) | — | — | 55.0 | — |
| 10. | 0.001 g 2-propyn-1-ol | 4.25 | 1,900,000 (5,0.3) | 101.1 | — | — | — |
| 11. | 0.001 g 2-buten-1,4-diol | 5.0 | 1,220,000 (5,0.3) | — | 98.4 | 190.2 | — |
| 12. | 0.001 g tetrahydrofurfuryl alcohol | * | 660,000 (5,0.3) | 233.3 | — | 127.3 | — |
| 13. | 0.01 g tetrahydrofurfuryl alcohol | * | 2,060,000 (5,0.3) | — | — | 10.9 | — |
| 14. | 0.001 g tetrahydrofurfuryl alcohol | 3.08 | 2,100,000 (5,0.3) | — | — | 1.0 (2,0.3) | — |

*Not Determined

The results of these tests show that the use of the alcoholic compounds in the aqueous compositions resulted, after a period of time and a temperature of about 250° F., in compositions having greater viscosity than the compositions that did not contain the alcoholic compounds.

EXAMPLE II

A series of tests were performed in the same manner as Example I except that the tests were carried out at 220° F. and either a polymerization retarder or crosslinking agent, or both, were optionally included in the aqueous polymerizable composition. The viscosity of the aqueous polymericable composition was measured up to periods of 30 days. The results of these tests are shown in Table II.

TABLE II

| Test No. | Alcoholic Compound and Other Additives | Pump Time (Hours) | 24 Hour Viscosity cps (Spindle, rpm) | Viscosity (% of 24 Hour Value) After | | | | | |
|---|---|---|---|---|---|---|---|---|---|
| | | | | 5 days | 7 days | 13 days | 14 days | 21 days | 30 days |
| 1. | 0.001 g allyl alcohol 1.5 cc 1% Potassium ferricyanide | 5.3 (avg.) | 2,400,000 (5,0.3) | 153.3 | — | 0.05 (5,3) | — | — | — |

TABLE II-continued

| Test No. | Alcoholic Compound and Other Additives | Pump Time (Hours) | 24 Hour Viscosity cps (Spindle, rpm) | Viscosity (% of 24 Hour Value) After | | | | | |
|---|---|---|---|---|---|---|---|---|---|
| | | | | 5 days | 7 days | 13 days | 14 days | 21 days | 30 days |
| 2. | 0.001 g allyl alcohol 0.5 cc 1% Potassium ferricyanide 10 cc 0.1% cumene hydroperoxide | 4.5 | 3,720,000 (5,0.3) | >107.5 | — | — | ***<br>3.2 (5,6) | — | 48.3 |
| 3. | 0.01 g allyl alcohol 1.5 cc 1% Potassium ferricyanide 10 cc 0.1% cumene hydroperoxide | 3.4 (avg.) | 2,320,000 (5,0.3) | 115.5 | — | — | 66.5 | — | — |
| 4. | 0.01 g allyl alcohol 10 cc 0.1% cumene hydroperoxide | 1–2 | 2,580,000 (5,0.3) | >155.0 | — | — | 100.8 | — | — |
| 5. | 0.01 g allyl alcohol 1.5 cc 1% Potassium ferricyanide 5 cc 0.1% cumene hydroperoxide | — | * | — | — | — | — | — | — |
| 6. | 0.01 g allyl alcohol 1.5 cc 1% Potassium ferricyanide 5 cc 0.1% cumene hydroperoxide | — | | — | — | — | — | — | — |
| 7. | 0.01 g allyl alcohol 0.25 cc 1% Potassium ferricyanide 5.0 cc 0.1% cumene hydroperoxide | — | 1,700,000 (5,0.3) | — | 129.4 | — | 216.5 | — | — |
| 8. | 0.01 g allyl alcohol 5.0 cc 0.1% cumene hydroperoxide | 2.3 | 2,620,000 (5,0.3) | — | >152.7 | — | 143.5 | — | — |
| 9. | 0.01 g allyl alcohol 2.5 cc 0.1% cumene hydroperoxide | — | 1,980,000 (5,0.3) | — | 37.4 | — | — | — | — |
| 10. | 0.001 g allyl alcohol 10.0 cc 0.1% cumene hydroperoxide N-80 Iron Coupon | — | 1,980,000 (5,0.3) | — | 74.8 | 80.8** | 163.6 | — | — |
| 11. | 0.001 g allyl alcohol 10.0 cc 0.1% cumene hydroperoxide | — | 2,960,000 (5,0.3) | >100.0 | — | — | — | — | — |

*Solution set up with white solids present in mixture
**12 days
***Sample bottle leaked While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. A method of recovering fluid hydrocarbons from a subterranean formation having a temperature of at least 160° F. and which is penetrated by at least one well bore and for reducing the production of water therefrom comprising:

contacting said formation with an aqueous polymerizable composition comprising:

(a) a polymerization monomer selected from the group consisting of:

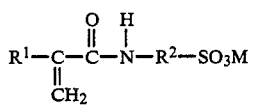    I.

wherein $R^1$ is selected from the group consisting of hydrogen and methyl;

$R^2$ is selected from the group consisting of an alkylene group having 1 to about 4 carbon atoms; and, M is selected from the group consisting of hydrogen, ammonium, and an alkali metal;

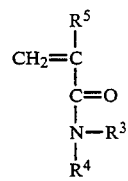    II.

wherein $R^3$, $R^4$, and $R^5$ are independently selected from the group consisting of hydrogen and methyl; and, mixtures of I and II;

(b) a polymerization catalyst having a latent period; and, (c) an alcoholic compound present in an amount of from about 0.01 to about 10 percent by weight of said monomer and selected from the group consisting of:

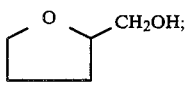 III.

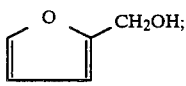 IV.

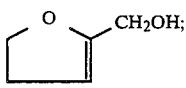 V.

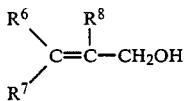 VI.

wherein:
$R^6$, $R^7$, and $R^8$ are independently selected from the group consisting of hydrogen and methyl;

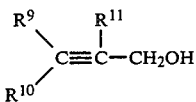 VII.

wherein
$R^9$, $R^{10}$, and $R^{11}$ are independently selected from the group consisting of hydrogen and methyl; and, mixtures of III, IV, V, VI, and VII.

2. The method recited in claim 1 wherein said polymerization monomer is selected from the group consisting of N,N-dimethylacrylamide, methacrylamide, N,N-dimethylmethacrylamide, acrylamide, 2-acrylamido-2-methylpropanesulfonic acid, the alkali metal salts of 2-acrylamido-2-methylpropanesulfonic acid, sodium 2-acrylamidopropanesulfonate, sodium 2-acrylamidoethanesulfonate, and mixtures thereof.

3. The method recited in claim 2 wherein said polymerization monomer is present in an amount of from about 2.5 to about 10.0 percent by weight of water of the aqueous composition.

4. The method recited in claim 2 wherein said alcoholic compound is selected from the group consisting of tetrahydrofurfuryl alcohol, furfuryl alcohol, dihydrofurfuryl alcohol, allyl alcohol, 2-buten-1-ol, 2-methyl-2-buten-1-ol, 3-methyl-2-buten-1-ol, propargyl alcohol, 2-methylpropyn-1-ol, 3-methylpropyn-1-ol, and mixtures thereof.

5. The method recited in claim 4 wherein said catalyst is selected from the group consisting of an organic peroxide, an inorganic peroxide, and mixtures thereof.

6. The method recited in claim 5 wherein said catalyst is selected from the group consisting of tert-butylhydroperoxide, cumene hydroperoxide, di(tert-butyl-peroxide), methyl ethyl ketone, ammonium persulfate, sodium persulfate, and mixtures thereof.

7. The method recited in claim 6 wherein said aqueous polymerizable composition further comprises a polymerization retarder.

8. The method recited in claim 6 wherein said aqueous polymerizable composition further comprises a crosslinking agent which is present in an amount of from about 0.01 to about 10.0 percent by weight of the monomer.

9. The method recited in claim 1 wherein said polymerization monomer in said aqueous polymerizable composition is acrylamide and said monomer is present in said aqueous polymerizable composition in an amount in the range of from about 2.5 to about 10.0 percent based on the water in said aqueous composition.

10. The method recited in claim 9 wherein said alcoholic compound is allyl alcohol and said alcoholic compound is present in an amount of about 0.5 percent by weight of said polymerization monomer.

11. The method recited in claim 10 wherein said polymerization catalyst is cumene hydroperoxide and said catalyst is present in an amount of from about 0.01 to about 0.1 percent by weight of the polymerization monomer.

12. The method recited in claim 11 wherein aqueous polymerizable composition further comprises from about 0.01 to about 10.0 percent by weight of a crosslinking agent and said crosslinking agent is selected from the group consisting of N,N'-methylenebisacrylamide, 1,1-bis(acrylamido)-2-methyl-2-propanesulfonic acid, bisacrylamidoacetic acid, and mixtures thereof.

13. A method of reducing the permeability of a subterranean formation having a temperature from about 160° F. to about 250° F. and penetrated by at least one well bore comprising contacting said formation with an aqueous polymerizable composition comprising:
(a) a polymerization monomer selected from the group consisting of:

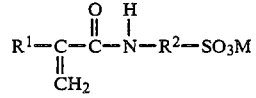 I.

wherein
$R^1$ is selected from the group consisting of hydrogen and methyl;
$R^2$ is selected from the group consisting of an alkylene group having 1 to about 4 carbon atoms; and,
M is selected from the group consisting of hydrogen, ammonium, and an alkali metal;

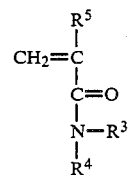 II.

wherein
$R^3$, $R^4$, and $R^5$ are independently selected from the group consisting of hydrogen and methyl; and, mixtures of I and II;
(b) a polymerization catalyst having a latent period; and,
(c) an alcoholic compound present in an amount of from about 0.01 to about 10.0 percent by weight of said monomer and selected from the group consisting of:

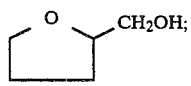 III.

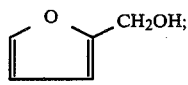 IV.

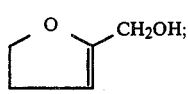 V.

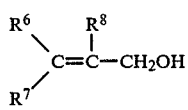 VI.

wherein: $R^6$, $R^7$, and $R^8$ are independently selected from the group consisting of hydrogen and methyl;

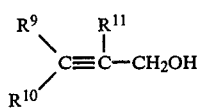 VII.

wherein
$R^9$, $R^{10}$, and $R^{11}$ are independently selected from the group consisting of hydrogen and methyl; and, mixtures of III, VI, V, VI, and VII.

14. The method recited in claim 13 wherein said polymerization monomer is selected from the group consisting of N,N-dimethylacrylamide, methacrylamide, N,N-dimethylmethacrylamide, acrylamide, 2-acrylamido-2-methylpropanesulfonic acid, the alkali metal salts of 2-acrylamido-2-methylpropanesulfonic acid, sodium 2-acrylamidopropanesulfonate, sodium 2-acrylamidoethanesulfonate, and mixtures thereof.

15. The method recited in claim 14 wherein said polymerization monomer is present in an amount of from about 2.5 to about 10.0 percent by weight of water of the aqueous composition.

16. The method recited in claim 15 wherein said alcoholic compound is selected from the group consisting of tetrahydrofurfuryl alcohol, furfuryl alcohol, dihydrofurfuryl alcohol, allyl alcohol, 2-buten-1-ol, 2-methyl-2-buten-1-ol, 3-methyl-2-buten-1-ol, propargyl alcohol, 2-methylpropyn-1-ol, 3-methylpropyn-1-ol, and mixtures thereof.

17. The method recited in claim 16 wherein said aqueous polymerizable composition further comprises a crosslinking agent which is present in an amount of from about 0.01 to about 10.0 percent by weight of the monomer.

18. The method recited in claim 13 wherein said polymerization monomer in said aqueous polymerizable composition is acrylamide and said monomer is present in said aqueous polymerizable composition in an amount in the range of from about 2.5 to about 10.0 percent based on the water in said aqueous composition.

19. The method recited in claim 18 wherein said alcoholic compound is allyl alcohol and said alcohol is present in an amount of about 0.5 percent by weight of said polymerization monomer.

20. The method recited in claim 19 wherein said polymerization catalyst is cumene hydroperoxide and said catalyst is present in an amount of from about 0.01 to about 0.1 percent by weight of the polymerization monomer.

* * * * *